United States Patent [19]

Hirano et al.

[11] Patent Number: 5,099,166

[45] Date of Patent: Mar. 24, 1992

[54] VIBRATION WAVE DRIVEN MOTOR

[75] Inventors: Takayuki Hirano, Tokyo; Tohru Kawai, Kawasaki; Ichiro Okumura, Yokohama, all of Japan

[73] Assignee: Canon Kabushiki Kaisha, Tokyo, Japan

[21] Appl. No.: 408,426

[22] Filed: Sep. 14, 1989

Related U.S. Application Data

[63] Continuation of Ser. No. 141,521, Jan. 7, 1988, abandoned.

[30] Foreign Application Priority Data

| Jan. 12, 1987 | [JP] | Japan | 62-4589 |
| Jan. 12, 1987 | [JP] | Japan | 62-4595 |

[51] Int. Cl.⁵ ............................ H01L 41/08
[52] U.S. Cl. ............................ 310/323
[58] Field of Search ................ 310/323, 328

[56] References Cited

U.S. PATENT DOCUMENTS

| 4,484,099 | 11/1984 | Kawai et al. | 310/328 X |
| 4,495,432 | 1/1985 | Katsuma et al. | 310/328 |
| 4,580,073 | 4/1986 | Okumura et al. | 310/328 X |
| 4,634,916 | 1/1987 | Okada et al. | 310/328 X |
| 4,672,256 | 6/1987 | Okuno | 310/328 X |
| 4,692,651 | 9/1987 | Hiramatsu et al. | 310/328 X |
| 4,736,129 | 4/1988 | Endo et al. | 310/328 X |
| 4,739,212 | 4/1988 | Imasaka et al. | 310/328 X |
| 4,743,791 | 5/1988 | Kawai | 310/328 X |
| 4,752,711 | 6/1988 | Tsukimoto et al. | 310/323 |
| 4,771,203 | 9/1988 | Mukohjima et al. | 310/323 |

FOREIGN PATENT DOCUMENTS 0213585 9/1987 Japan .......................... 310/323

*Primary Examiner*—Mark O. Budd
*Attorney, Agent, or Firm*—Fitzpatrick, Cella, Harper & Scinto

[57] ABSTRACT

A vibration wave driven motor includes a vibrating member for generating a travelling vibration wave in response to signals applied thereto a movable body having a frictional member contacting the vibrating member, a bearing member and a vibration damper member provided between the frictional member and the bearing member in order to absorb the vibration; and an adhering member for adhering at least either of an end of the damper member in contact with the frictional member or another end of the damper member in contact with the bearing member to the frictional member or the bearing member which is opposed to either of the ends.

7 Claims, 6 Drawing Sheets

VIBRATION WAVE DRIVEN MOTOR

This application is a continuation of application Ser. No. 141,521 filed Jan. 7, 1988, now abandoned.

BACKGROUND OF THE INVENTION

1. Field of the Invention

The present invention relates to a vibration wave driven motor and, more particularly, to a structure of a movable member of a vibration wave driven motor in which the movable member is frictionally driven in accordance with a traveling vibration wave.

2. Related Background Art

A conventional vibration wave driven motor is described in U.S. application Ser. No. 016,734 (filing date: Feb. 20, 1987) and Japanese Patent Laid-Open Application No. 224884/1986. Vibrations generated upon application of a cyclic voltage to a piezoelectric vibrator serving as an electrical energy/mechanical energy conversion element are utilized to drive the movable member. In such a conventional vibration wave driven motor, the movable member is in contact with the vibrator, and noise tends to be generated. In the conventional structure, a damper is disposed on the movable member to reduce noise.

However, sufficient reduction of noise cannot be achieved due to variations in thickness of the damper and roughness of the surface of the movable member.

SUMMARY OF THE INVENTION

It is an object of the present invention to reduce noise generated by a vibration wave driven motor, wherein tight contact between a damping material and a movable member in the motor is obtained by using a contact member.

It is another object of the present invention to provide a vibration wave driven motor suitable for driving a lens barrel of a camera with a small amount of noise.

It is still another object of the present invention to provide a vibration wave driven motor for minimizing noise generated between the vibrator and a fixing member for the vibrator, wherein the fixing member for the vibrator is made of a nonmetallic material such as a resin.

It is a further object of the present invention to provide a vibration wave motor including a vibration wave driven motor which includes a vibrating member for generating a travelling vibration wave in response to signals applied to the member, and a movable body having a frictional member contacting the vibrating member. A bearing member and a vibration damper member are provided between the frictional member and the bearing member in order to absorb the vibration. An adhering agent adheres at least either of an end of the damper member in contact with the frictional member or another end of the damper member in contact with the bearing member to the frictional member or the bearing member which is opposed to either of the ends.

The above and other objects, features, and advantages of the present invention will be apparent from the following detailed description in conjunction with the accompanying drawings.

Figure 1:
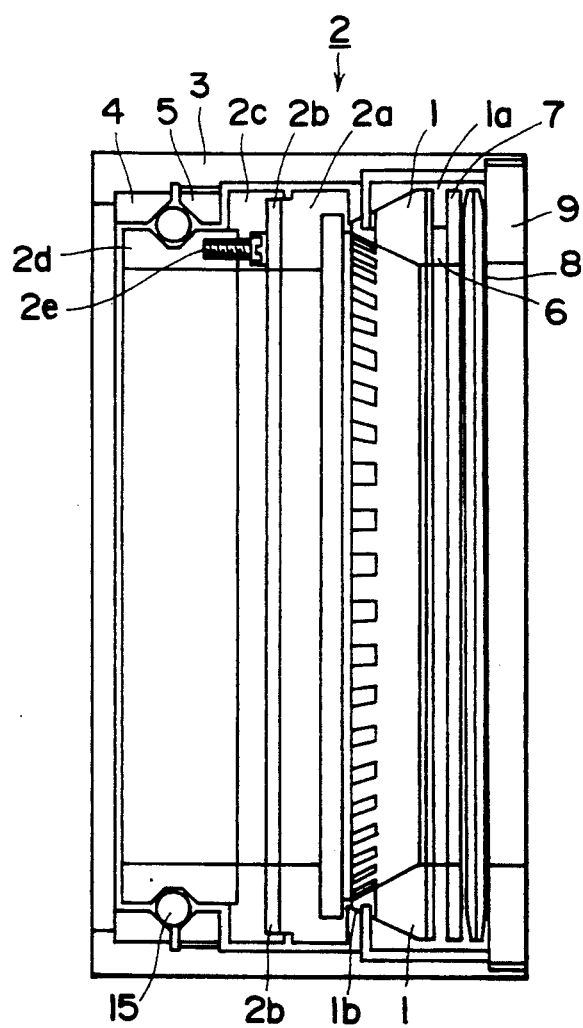
FIG. 1 is a sectional view of a vibration wave driven motor according to an embodiment of the present invention.

DETAILED DESCRIPTION OF THE PREFERRED EMBODIMENTS:

FIG. 1 is a sectional view of a vibration wave driven motor according to an embodiment of the present invention.

Referring to FIG. 1, the vibration wave driven motor includes a ring-like vibrator 1. The vibrator is made of an elastic material such as nickel steel or brass. A known electrostrictive element 1a is attached to the bottom of the vibrator 1.

A ring-like movable member 2 is in contact with an upper surface 1b of the vibrator 1 under pressure. The movable member 2 comprises a frictional member 2a, a damper 2b, a damper seat member 2c, and a bearing member 2d. The end portion of the frictional member 2a is in contact with the upper surface 1b of the vibrator 1. The damper 2b contacting the frictional member 2a is made of an elastic material having good damping characteristics.

The damper seat member 2c comprises a ring-like metal member and is fixed to the ring-like metal member which is fixed to the ring-like bearing member 2d by screws 2e.

A fixing member 3 causes bearing members 4 and 5 to rotatably support the movable member 2 through ball bearings 15.

The other surface of the vibrator 1 is in contact with a press ring 9 through a felt member 6, a felt holding plate 7, and a Belleville spring 8 for bringing the vibrator 1 into contact with the movable member 2 under pressure.

Figure 2:
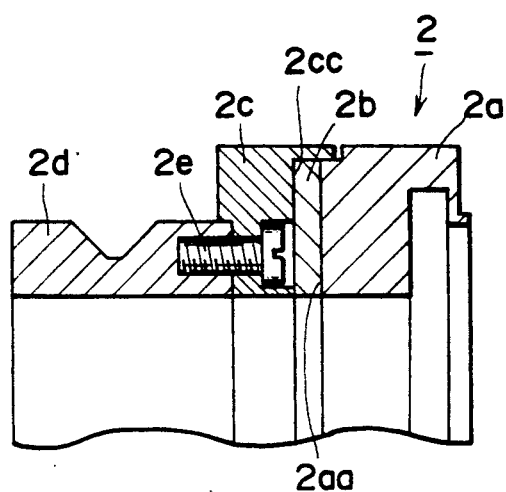
FIG. 2 is an enlarged sectional view of a movable member in the motor shown in FIG. 1.

FIG. 2 is a sectional view of the movable member 2. The damper 2b is clamped between the frictional member 2a and the damper seat member 2c. Smoothness of an upper surface 2aa of the frictional member 2a and a lower surface 2cc of the damper seat member 2c is high. When uniformity of the thickness of the damper 2b is ideal, the damping characteristics are good. Vibrations generated by the frictional member 2a can be immediately absorbed, and noise can be prevented. However, in practice, smoothness of the surfaces 2aa and 2cc and uniformity of the thickness of the damper 2b differ from those of the ideal state. Air is present between the lower surface 2cc and the damper 2b and between the surface 2aa and the damper 2b. The actual contact area is small, and the vibrations generated by the frictional member 2a cannot be satisfactorily absorbed. As a result, noise is generated.

According to an embodiment of the present invention, an adhesive is used as a contacting material The damper 2b, the frictional member 2a, and the damper seat member 2c are adhered by the adhesive to prevent formation of the air gaps. Contact between the damper 2b and the upper surface 2aa of the frictional member 2a and between the lower surface 2cc and the damper seat member 2c is improved, and the vibrations are satisfactorily absorbed, thereby preventing generation of noise.

The operation of the vibration wave driven motor for moving the movable member 2 with the traveling vibration wave generated by the vibrator 1 is the same as that of the previous applications, and a detailed description thereof will be omitted.

An adhesive material such as an adhesive tape may be used in place of the adhesive.

Figure 3:
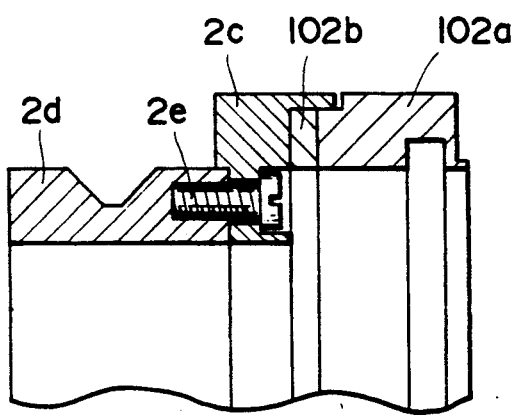
FIGS. 3 and 4 are enlarged sectional views of a movable member according to another embodiment of the present invention.
Figure 4:
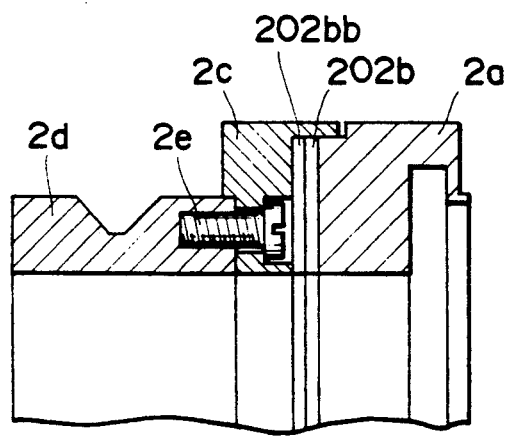

FIGS. 3 and 4 show modifications of the above embodiment.

FIG. 3 is a sectional view showing the main part of the movable member in the vibration wave driven motor which employs the present invention. A frictional member 102a and a damper 102b in FIG. 3 correspond to the frictional member 2a and the damper 2b shown in FIG. 2. In the modification shown in FIG. 3, the ring-like damper 102b is disposed in the peripheral portion of the ring-like frictional member 2a, and the mass of the frictional member 102a is reduced to prevent noise.

In the modification of FIG. 3, members 102a and 102b, and a damper seat member 2c are adhered to each other in the same manner as in the above embodiment, and the integral body is removed by loosening screws 2e. Therefore, a bearing member 2d and the members 102a, 102b, and 2e can be conveniently detachable during assembly, e.g., replacement of parts.

As shown in FIG. 4, a damper can be divided into halves 202b and 202bb. One half 202b is adhered to the frictional member 2a, and the other half 202bb is adhered to the damper seat member 2c. The damper halves 202b and 202bb are frictionally engaged with each other, and easy maintenance such as assembly or disassembly can be performed.

The vibration wave driven motor portion in FIG. 3 or 4 is the same as the embodiment shown in FIG. 1, and a detailed description thereof will be omitted.

In the above embodiment and its modifications, the upper and lower surfaces of the dampers 2b, 102b and the damper halves 202b and 202bb are adhered to the frictional members 2a and 101a and to the damper seat members 2c by the adhesive. However, only the upper surface of the damper 2b may be adhered to an end face 2aa of the frictional member 2a, and the lower surface of the other damper 2b may be kept in frictional contact with an end face 2cc of the damper seat member 2c. In this case, one surface, i.e., the upper surface, of the damper 2b is adhered, and the air gap causing generation of noise can be eliminated. Therefore, noise can be reduced as compared with the conventional motor.

FIGS. 5 to 8 show another embodiment of the present invention. In this embodiment, noise generated between a vibrator and a fixing member for fixing a movable member of the vibrator is also reduced.

Figure 5:
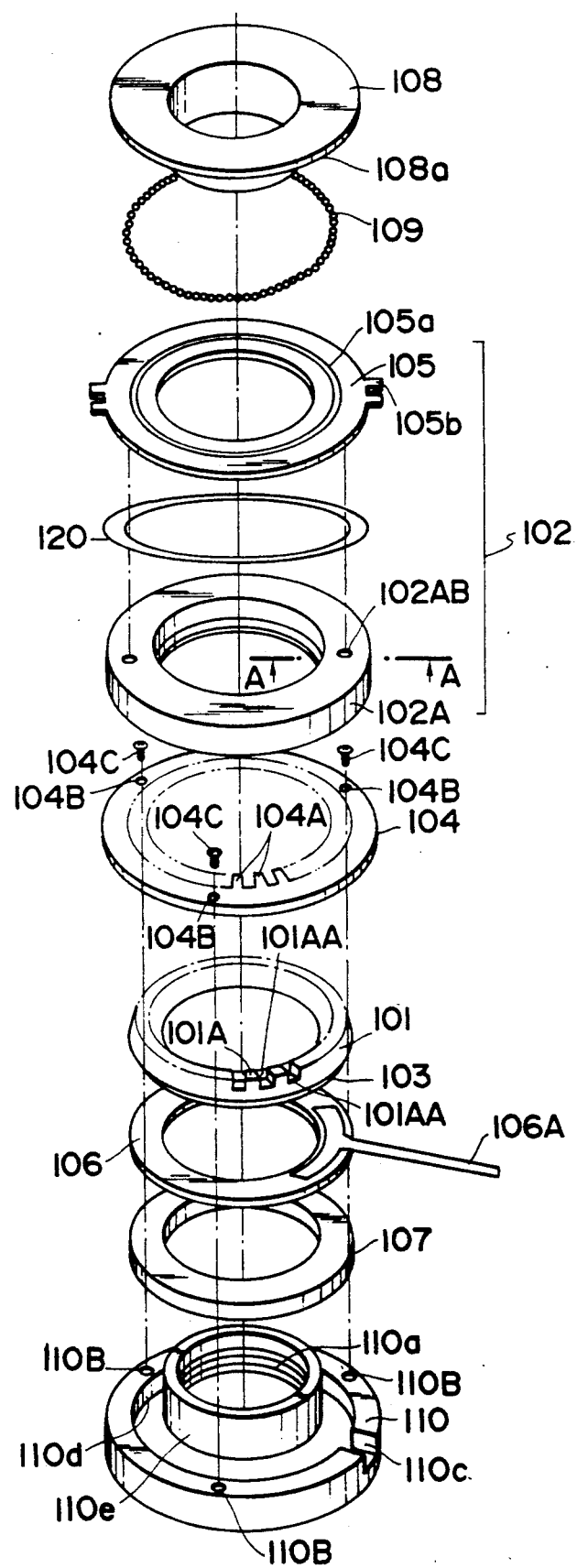
FIG. 5 is an exploded perspective view of a vibration wave driven motor according to still another embodiment of the present invention.
Figure 6:
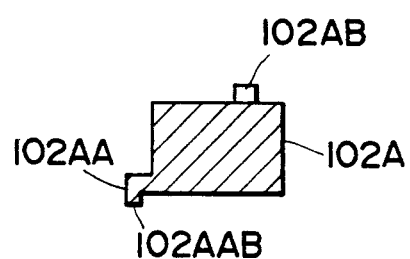
FIG. 6 is a sectional view of a rotor body 102A shown in FIG. 5 taken along the line A—A thereof.
Figure 7:
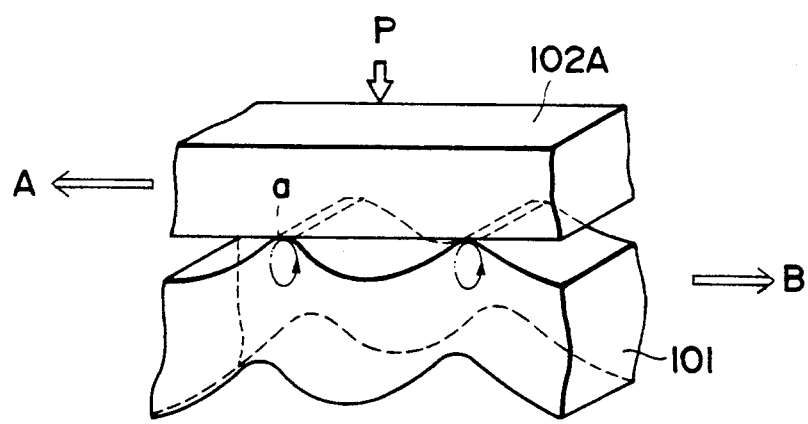
FIG. 7 is a view for explaining the operation of an elastic member 101 and the rotor body shown in FIG. 5.

FIG. 5 is an exploded perspective view of the vibration wave driven motor of this embodiment. FIG. 6 is a sectional view of the motor of FIG. 5 taken along the line A—A thereof. Referring to FIGS. 5 and 6, a vibrator 101 comprises an elastic member. A known piezoelectric or electrostrictive element 103 is adhered to the lower portion of the elastic member 101 at a position indicated in, e.g., Japanese Patent Laid-Open Application No. 148581/1984. When two cyclic voltages having a phase shift (e.g., 90°) are applied to the piezoelectric or electrostrictive element 103, the elastic member 101 is vibrated in a manner as described in Japanese Patent Laid-Open Application No. 148581/1984. A traveling wave shown in FIG. 7 is generated on the basis of a principle described in Japanese Patent Laid-Open Application No. 148581/1984. For illustrative convenience, a comb-like contact portion 101A is not illustrated in FIG. 7.

The comb-like contact portion 101A having a plurality of projections of a rectangular prism is formed in the upper portion of the elastic member 101 in order to improve efficiency, as shown in FIG. 5. Projections 104A of a fixing member 104 which are made of a nonmetallic material such as a resin are respectively engaged with slits 101AA defined in the comb-like contact portion 101A. The shape of teeth of the comb-like contact portion 101A is not limited to a rectangular prism. Each tooth in the comb-like contact portion 101 may have a prism-like, trapezoidal, or cylindrical shape. A ring-like movable member 102 comprises a rotor body 102A and a holding plate 105. The lower portion of the rotor body 102A comprises an L-shaped projection 102AA which is brought into frictional contact with the upper surface of the comb-like contact portion 101A of the elastic member 101, as shown in FIG. 6. The upper portion of the rotor body 102A comprises a projection 102AB for fixing the holding plate 105 to the rotor body. The holding plate 105 comprises an annular groove 105a, recesses 105b constituting an output portion of the motor, and recesses (not shown) respectively engaged with the projections 102AB of the rotor body 102A.

A damper 106 is made of rubber, felt, or the like to hold a piezoelectric or electrostrictive element serving as an electric energy/mechanical energy conversion element. A flexible printed board 106A constituting a conductive portion for applying cyclic voltages to the conversion element 103 is placed on the upper surface of the damper 106. A compressing mechanism 107 generates a pressure P (FIG. 7) between the elastic member 101 and the movable member 102.

Hollow holding cylinders 108 and 110 hold the elastic member 101 and the movable member 102 from the upper and lower directions, respectively. The pressure between the elastic member 101 and the movable member 102 is adjusted by screws 108a of the upper holding cylinder 108 and screws 110a of the lower holding cylinder 110. The lower holding cylinder 110 is fitted in or on the elastic member 101 and is made of a nonmetallic material such as a resin. A groove 110c formed in the lower holding cylinder 110 receives the flexible printed board 106A therein. The movable member 102 is rotatably supported by the groove 105a of the holding plate 105 and a bearing 109.

Three fitting holes 104B are formed in the fixing member 104 to fix the fixing member 104 to the lower holding cylinder 110. In this case, the fixing member 104 is provided to prevent movement (rotation in this case) of the elastic member 101 which is caused by movement of the movable member 102 in a direction indicated by arrow A in FIG. 7. Screws 104C are threadably engaged with screw holes 110B of the holding cylinder 110 through the holes 104B, thereby fixing the fixing member 104 to the lower holding cylinder 110. The lower holding cylinder 110 is fixed to part of equipment employing the vibration wave driven motor. For example, the lower holding cylinder 110 is fixed to a desired portion (not shown) when an auto focus lens is used. In this case, the recesses 105b of the holding plate 105 are engaged with a pivotal portion of the lens.

A damper 120 is made of butyl rubber or the like and corresponds to the damper 2b in FIG. 1. The damper 120 is adhered to the peripheral portion of the rotor body 102A and the peripheral portion of the holding plate 105a by an adhesive in the same manner as in the damper 2b in FIG. 1.

With the above structure, when a cyclic voltage is applied to the conversion element 103 through a printed circuit board 106A according to a known method, a traveling vibration wave is generated by the elastic member 101 in a direction indicated by arrow B in FIG. 7, and a contact portion 102AAB of the rotor body 102A is brought into frictional contact with the comb-like contact portion 101A formed in the upper portion of the elastic member 101. The rotor body 102A is rotated together with the holding plate 105 in the direction indicated by arrow A (FIG. 7). Using this rotation an auto focus lens (not shown) is pivoted through the recesses 105b of the holding plate 105 in the extension or retraction direction.

Figure 8:
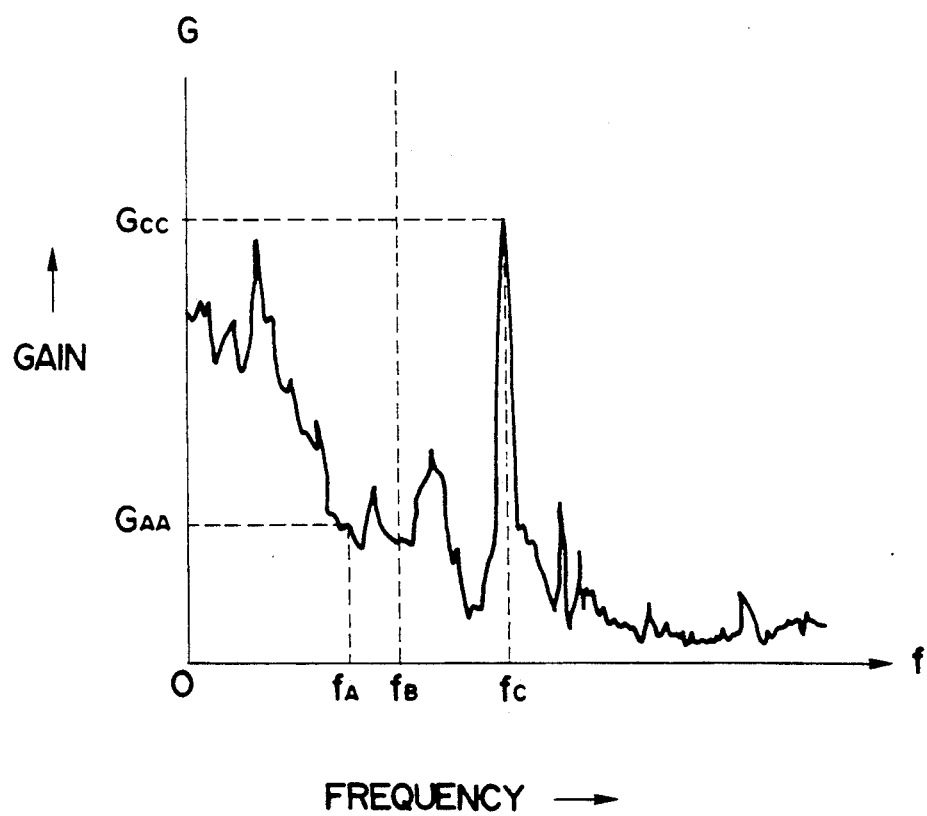
FIG. 8 is a graph showing the relationship between the frequency and the sound pressure level.

When the rotor body 102A is rotated in the direction of arrow A by frictional driving described above, a reaction force naturally acts on the elastic member 101, and the elastic member 101 receives a rotational force in the direction of arrow B. The elastic member 101 tends to be rotated in the direction of arrow B. When such a rotational force is generated, rotation of the elastic member 101 tends to be prevented since the projections 104A (the projections 104A are formed at angular intervals shown in FIG. 5 along the inner periphery of the fixing member 104 in this embodiment) of the fixing member 104 are engaged with the slits 101AA. In this case, since the projections 104A are made of a nonmetallic material such as a resin, they are in elastic contact with the slits 101AA. Fitting portions 110d and 110e of the holding cylinder 110 which are in contact with the vibrator 101 are also made of a nonmetallic material such as a resin, and excessive rigidity is not provided. Even if the vibrator 101 is locally brought into contact with the holding cylinder 110, elastic contact can be achieved. Therefore, as shown in FIG. 8, noise (gain) GAA of the frequency fA (fA = fC/2) can be greatly reduced, and the noise having a frequency below a frequency fB as the audible range limit can be reduced.

When the movable member is driven while the vibrator 101 is driven such that the resonant frequency fC and the audible range limit frequency fB satisfy condition 2fB > fC, the frequency fA causing large noise is shifted to a high-frequency range exceeding the audible range, thereby further reducing noise.

According to the present invention, the contacting means is used to bring the damper into tight contact with the frictional member or with the damper seat member constituting the bearing to reduce the air gap, and noise can be reduced. Therefore, a quiet vibration wave driven motor can be provided.

When the dampers 2b and 120 are made of members such as rubber members which are deformed by their own weights, assembly efficiency is degraded. However, according to the embodiments of the present invention, since the damper is adhered to the elastic member made of a metal member, assembly efficiency can be improved.

According to the embodiments of the present invention, since the material of the fixing member is a nonmetallic material such as a resin, the spring constant of each projection of the fixing member is not high when compared with a conventional structure using a metal. Therefore, the vibrator can be brought into soft contact with the projections of the fixing member. Noise having an audible frequency range and generated at a frequency ½ the resonant frequency can be reduced. In addition, since the fixing member is brought into elastic contact with the vibrator, the vibrations of the vibrator are not adversely affected as compared with the conventional metal fixing member, and degradation of the operation can also be prevented.

In the above embodiments, the resonant frequency is twice or more the frequency at the audible range limit, and noise generated at an audible frequency range during driving can be reduced.

In each of the above embodiments, the fixing member and the holding member are entirely made of a nonmetallic material such as a resin. However, only the projections of the fixing member which are in contact with the vibrator and the contact portions between the holder and the vibrator may be made of a nonmetallic material such as a resin, thereby obtaining the same effect as in the above embodiments.

We claim:

1. A vibration wave driven motor comprising:
   a vibration member for generating a travelling vibration wave, said vibration member being formed in a comb-like shape with a plurality of slits;
   a movable member having a frictional part frictionally contacting said vibration member;
   a vibration damper member provided between said movable member and a holding member in order to absorb the vibration generated by said vibration member;
   an electromechanical conversion member provided on said vibration member for causing said vibration member to generate the travelling vibration wave for relatively moving said movable member and said vibration member in response to signals applied thereto;
   an adhesive agent for adhering at least either of an end of said vibration damper member in contact with said movable member or another end of said vibration damper member in contact with said holding member to said movable member or said holding member which is opposed to either of said ends; and
   a fixing member having projecting portions to be fitted into said slits for fixing said vibration member at a predetermined position, said projecting portions being formed from a resinous material.

2. A vibration wave driven motor according to claim 1, wherein said vibration damper member is made of butyl rubber.

3. A vibration wave driven actuator comprising:
   a vibration member for generating a travelling vibration wave, said vibration member being formed in a comb-like shape with a plurality of slits;
   a vibration applying member for causing said vibration member to generate the travelling vibration wave for relatively moving a frictional force receiving member by the travelling wave member in response to signals applied thereto; and a fixing member having projecting portions to be inserted into said slits for fixing said vibration member at a predetermined position, said projecting portions being formed from a resinous material.

4. A vibration wave driven motor comprising:

a vibration member for generating a travelling vibration wave in response to signals applied thereto, said vibrating member being formed i a comb-like shape with a plurality of slits;

a movable body including a frictional member having a first surface frictionally contacting said vibration member, a rotatable member and a vibration damper member provided between a second surface of said frictional member which is opposed to the first surface of said frictional member and said rotatable member in order to absorb the vibration; and a fixing member having projecting portions to be fitted into said slits for fixing said vibrating member at a predetermined position, said projecting portions being formed from a resinous material.

5. A vibration wave driven actuator comprising:

a vibration member for generating a travelling vibration wave;

a vibration applying member for causing said vibration member to generate the travelling vibration wave for relatively moving a frictional force receiving member by the travelling vibration wave in response to signals applied thereto, said receiving member having a first surface contacting said vibration member and a second surface which is opposed to the first surface;

a holding member;

a vibration damper member provided between the second surface of said receiving member and said holding member in order to absorb a part of the vibration generated by said vibration member; and an adhesive agent for adhering at least either of a side of said vibration damper member in contact with said second surface of said receiving member or another side of said vibration damper member in contact with said holding member to said receiving member or said holding member which is opposed to either of said sides whereby said adhesive agent is applied in such a manner that air gaps are eliminated between said vibration member and said surface to which it is adhesively in contact with in order to minimize the formation of noise.

6. A vibration driven motor comprising:

a vibration member for generating a vibration;

a vibration applying member for causing said vibration member to generate the vibration for relatively moving a frictional force receiving member by the vibration in response to signals applied thereto, said receiving member having a first surface contacting said vibration member and a second surface which is opposed to said first surface;

a holding member;

a vibration damper member provided between said second surface of said receiving member and said holding member in order to absorb the vibration generated by said vibration member; and an adhesive agent for adhering at least either of a side of said vibration damper member in contact with said second surface of said receiving member or another side of said vibration damper member in contact with said holding member to said receiving member or said holding member which is opposed to either of said sides whereby said adhesive agent is applied in such a manner that air gaps are eliminated between said vibration member and said surface to which it is adhesively in contact with in order to minimize the formation of noise.

7. A vibration wave driven device comprising:

a vibration member for generating a travelling vibration wave;

a vibration applying member for causing said vibration member to generate the travelling vibration wave for relatively moving a frictional force receiving member by the travelling vibration wave in response to signals applied thereto, said receiving member being rotatable and having a first surface contacting said fibration member and a second surface which is opposed to said first surface;

a holding member engaged with a portion of said device;

a vibration damper member provided between said second surface of said receiving member and said holding member in order to absorb a part of the vibration generated by said vibration member; and an adhesive agent for adhering at least either of a side of said vibration damper member in contact with said second surface of said receiving member or another side of said vibration damper member in contact with said holding member to said receiving member or said holding member which is opposed to either of said sides whereby said adhesive agent is applied in such a manner that air gaps are eliminated between said vibration member and said surface to which it is adhesively in contact with in order to minimize the formation of noise.

* * * * *

UNITED STATES PATENT AND TRADEMARK OFFICE
CERTIFICATE OF CORRECTION

PATENT NO. : 5,099,166
DATED : March 24, 1992
INVENTOR(S) : Hirano et al.

It is certified that error appears in the above-identified patent and that said Letters Patent is hereby corrected as shown below:

COLUMN 2:

Line 22, "EMBODIMENTS:" should read --EMBODIMENTS--.

COLUMN 5:

Line 25, "rotation" should read --rotation,--.

COLUMN 7:

Line 10, "i" should read --in--.

COLUMN 8:

Line 34, "fibration" should read --vibration--.

Signed and Sealed this

Twenty-eighth Day of September, 1993

Attest:

BRUCE LEHMAN

Attesting Officer

Commissioner of Patents and Trademarks